United States Patent
Youn et al.

(10) Patent No.: US 10,193,343 B2
(45) Date of Patent: Jan. 29, 2019

(54) METHOD FOR MANAGING POWER OF ENERGY STORAGE SYSTEM CONNECTED WITH RENEWABLE ENERGY

(71) Applicant: DOOSAN HEAVY INDUSTRIES & CONSTRUCTION CO., LTD., Gyeongsangnam-do (KR)

(72) Inventors: Ju Young Youn, Gyeonggi-do (KR); Sung Ku Park, Gyeonggi-do (KR); Young Hoon Rhie, Gyeonggi-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 157 days.

(21) Appl. No.: 15/431,964

(22) Filed: Feb. 14, 2017

(65) Prior Publication Data

US 2017/0237259 A1 Aug. 17, 2017

(30) Foreign Application Priority Data

Feb. 15, 2016 (KR) ...................... 10- 2016-0017164

(51) Int. Cl.
*H02J 3/38* (2006.01)
*H02J 3/28* (2006.01)
*H02J 7/00* (2006.01)
*H02J 3/00* (2006.01)

(52) U.S. Cl.
CPC ............... *H02J 3/382* (2013.01); *H02J 3/28* (2013.01); *H02J 7/007* (2013.01); *H02J 2003/003* (2013.01)

(58) Field of Classification Search
CPC ..... H02J 3/3823; H02J 7/007; H02J 2003/003
See application file for complete search history.

(56) References Cited

FOREIGN PATENT DOCUMENTS

| KR | 20130034395 A | 4/2013 |
| KR | 20140067654 A | 6/2014 |

OTHER PUBLICATIONS

Korean Office Action issued by the Korean Intellectual Property Office dated Sep. 9, 2016 in connection with Korean Patent Application No. 10-2016-0017164.
An International Search Report dated Apr. 20, 2017 in connection with International patent application No. PCT/KR2017/001243.

*Primary Examiner* — Robert Deberadinis
(74) *Attorney, Agent, or Firm* — INVENSTONE Patent, LLC

(57) ABSTRACT

A method for managing power of an energy storage system (ESS) connected to renewable energy, the ESS including an energy storage device connected to a power grid, a battery management system (BMS), a power conditioning system (PCS), and one or more renewable energy generation facilities producing electric energy from renewable energy, the steps including of determining a predicted power consumption amount of a power load and a predicted power production amount of the renewable energy generation facility, predicting power production of the renewable energy generation facility based on the stored type and characteristics information of the renewable energy generation facilities, determining whether the energy storage device is fully charged with the power production from the renewable energy generation facility, and controlling charging/discharging operation of the energy storage device according to a charge/discharge schedule.

14 Claims, 4 Drawing Sheets

METHOD FOR MANAGING POWER OF ENERGY STORAGE SYSTEM CONNECTED WITH RENEWABLE ENERGY

CROSS-REFERENCE TO RELATED APPLICATION

This application claims priority to Korean Patent Application No. 10-2016-0017164, filed on Feb. 15, 2016, the disclosure of which is incorporated herein by reference in its entirety.

BACKGROUND

Exemplary embodiments described herein relate to a method for managing power of an energy storage system connected to renewable energy, and more particularly, to a method for efficiently managing power of an energy storage system connected to renewable energy according to characteristics of renewable energy and an energy storage device, such as a battery.

Renewable energy generally refers to combination of new energy and renewable energy. Renewable energy refers to energy generated by converting existing fossil fuels (i.e., new energy) or generated by converting energy such as sunlight, water, precipitation, and biological organisms (i.e., renewable energy). For example, renewable energy includes sunlight, solar heat, bio, wind power, water power, etc., and new energy includes fuel cells, hydrogen energy, etc.

An energy storage system (ESS) refers to a renewable energy generation system, such as solar energy, connected with a power storage system that stores renewable energy or surplus power from a power system in a chargeable and dischargeable energy storage device, such as a battery, and supplies power to a load if necessary. Korean Patent Laid-Open Publication No. 2013-0138611 discloses an energy storage system connected with a renewable energy generation system.

Generally, the energy storage system connected to the renewable energy generation system charges a battery with renewable energy or power from a power system and supplies power to a load through any one of a renewable energy, a power system, and a battery when power to the load is required. Interest in the renewable energy and the energy storage systems is increasing. System complexity is also increasing since the energy storage system needs to charge the battery using a plurality of power supply sources and needs to supply the power to a load. Therefore, technologies that may be optimized according to the characteristics of the renewable energy and the battery and to more efficiently manage storage and consumption of energy are required.

SUMMARY

An object is to provide a method for efficiently managing power of an energy storage system (ESS) connected to renewable energy according to characteristics of the renewable energy and an energy storage device, such as a battery. Other objects and advantages can be understood by the following description, and become apparent with reference to the described embodiments.

In accordance with one aspect, a method for managing power of an energy storage system (ESS) connected to renewable energy, the ESS including an energy storage device connected to a power grid, a battery management system (BMS), a power conditioning system (PCS), and one or more renewable energy generation facilities producing electric energy from renewable energy, includes the steps of determining a predicted power consumption amount of a power load and a predicted power production amount of the renewable energy generation facility (S100), storing type and characteristics information of the renewable energy generation facility (S200), predicting power production of the renewable energy generation facility based on the stored type and characteristics information (S300), determining a required discharge amount for the energy storage device (S400), determining whether a power shortage amount is equal to or greater than a predetermined value depending on the required charge amount of the energy storage device (S500), determining whether the energy storage device is fully charged with the power production from the renewable energy generation facility if the power shortage amount is smaller than the predetermined value (S600), and controlling charging/discharging operation of the energy storage device according to a charge/discharge schedule.

BRIEF DESCRIPTION OF THE DRAWINGS

The above and other objects, features and advantages will be more clearly understood from the following detailed description taken in conjunction with the accompanying drawings, in which.

DETAILED DESCRIPTION

Hereinafter, a method for managing power of an energy storage system connected to renewable energy according to an exemplary embodiment will be described in detail with reference to the accompanying drawings.

First, a schematic configuration of an energy storage system (hereinafter, ESS) connected to renewable energy according to an exemplary embodiment will be described.

Figure 1:
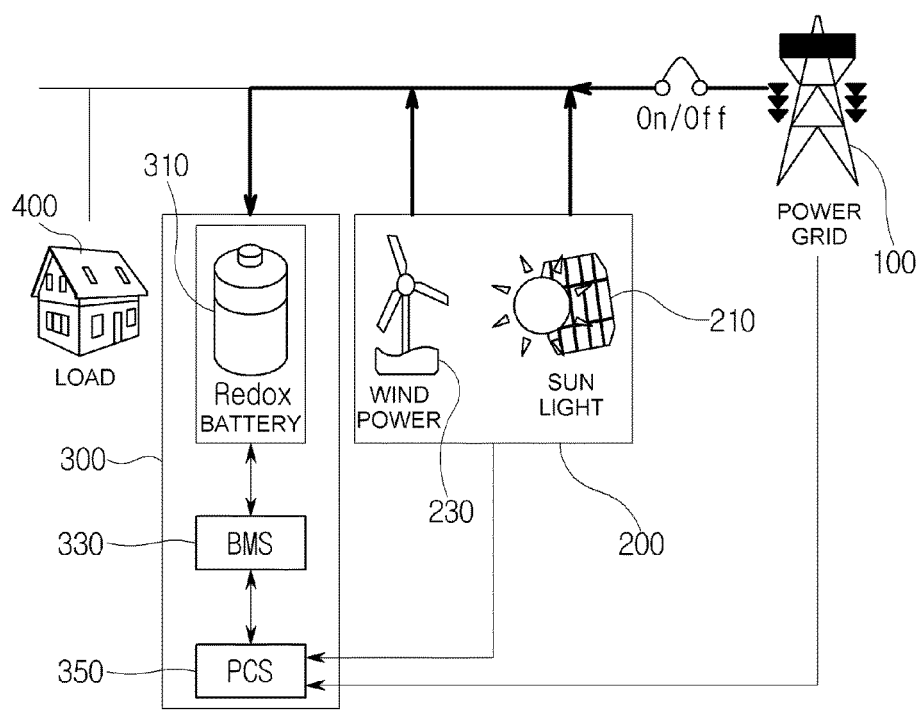
FIG. 1 is a schematic diagram illustrating an energy storage system connected to renewable energy charging an energy storage device according to an exemplary embodiment.
Figure 2:
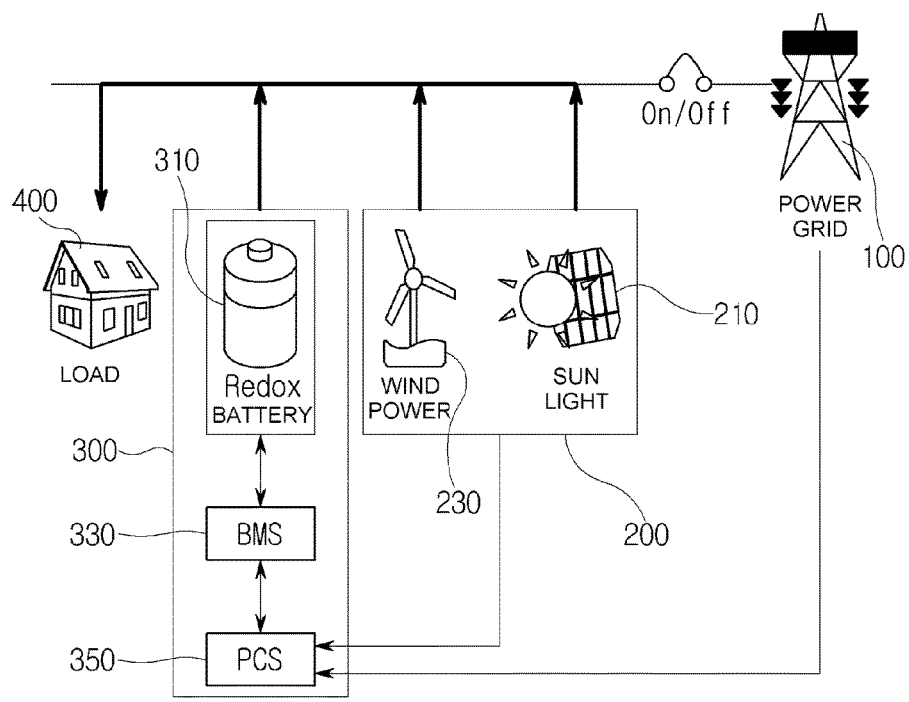
FIG. 2 is a schematic diagram illustrating an energy storage system connected to renewable energy discharging power from an energy storage device according to the exemplary embodiment.

FIG. 1 is a schematic diagram illustrating an energy storage system connected to renewable energy according to an exemplary embodiment when an energy storage device, such as a battery, is charged. FIG. 2 is a schematic diagram illustrating the energy storage system connected to renewable energy according to an exemplary embodiment when an energy storage device, such as a battery, is discharged.

As illustrated in FIGS. 1 and 2, an energy storage system connected to renewable energy according to an exemplary embodiment include at least one renewable energy generation facility 200 and an energy storage facility 300. The renewable energy generation facility 200 serves to supply power to the energy storage facility 300 or a power load 400, together with power supplied from a power grid 100. The power grid 100 is a power grid for supplying power produced by existing power generation systems such as heating power, water power, and nuclear power and the power load 400 refers to various power consumption facilities such as homes, buildings, factories, and the like.

The renewable energy generation facility 200 may be a power generation facility using renewable energies such as sunlight, wind power, tidal power, biomass, and different types of power generation facilities may be applied according to the location of installation. While at least one new and renewable energy generation facility 200 may be used, a plurality of facilities suitable for regional characteristics may be used for increased efficiency and optimization. For purposes of explanation, an exemplary case including a photovoltaic power generation facility 210 and wind power generation facility 230 will be described.

The photovoltaic power generation facility 210 may include a solar cell, a power conversion device converting electric energy produced from the solar cell from a direct current to an alternating current and connecting it to a power system, and a storage device temporarily storing the produced electric energy. The construction of the photovoltaic power generation facility is well-known, thus a detailed description thereof will be omitted.

The wind power generation facility 230 may include a blade, an energy conversion device converting kinetic energy of wind generated from the blade into electric energy, a power transmission device, a control device, and the like. The construction of the wind power generation facility is well-known, and therefore a detailed description thereof will be omitted.

The energy storage facility 300 includes a chargeable and dischargeable energy storage device, such as a battery 310, for example. The energy storage facility 300 charges the battery 310 to store energy and discharges the battery 310 to supply the stored energy to the power grid 100 or to the power load 400 as necessary. Generally, the energy storage facility 300 may include a battery management system (BMS) 330 for managing the charging and discharging of the battery 310 and a power conditioning system (PCS) 350 for supply and management of power.

The battery 310 may include various types of batteries, such as a flow battery and a secondary battery. For example, the battery 310 may include a fly wheel using a superconductor, a sodium-sulfur (NAS) battery, an all-solid battery, or the like. The battery 310 may be efficiently managed by changing a charge/discharge plan of the battery 310 according to types and characteristics of the battery. A short-term power operation plan may be established by additionally acquiring residual capacity of the battery. Further, the battery 310 serves as an energy repository for storing energy by charging power supplied through the renewable energy generation facility 200 or the power grid 100 and as an energy source for supplying the stored energy by discharging to the power load 400 or the power grid 100.

The PCS 350 is a power conversion device and serves to convert the power between AC and DC and necessary conversions between voltage, current, and frequency. The PCS 350 supplies energy from a power plant through the power grid 100 to the power load 400 or charges the battery 310 with the energy, or supplies energy from the renewable energy generation facility 200 to the power load 400 or charges the battery 310 with the energy. Alternatively, the energy stored by the battery 310 may be supplied to the power load 400 or the power grid 100 to perform power management. At this point, the charging/discharging operation of the battery 310 are performed in consideration of the types and the characteristic information of the battery 310. Further, the PCS 350 may monitor power consumed in the power load 400 and log the monitored power as information.

The BMS 330 is a battery management system that detects voltage, current, temperature, and the like of the battery to control a charge/discharge amount of the battery 310 to an appropriate level, performs cell balancing of the battery 310, and checks the residual capacity of the battery 310. In addition, the BMS 330 protects the battery 310 through an emergency operation when a dangerous situation is detected. The BMS 330 stores the type and the characteristic information of the battery 310 and manages the charging and discharging according to the characteristics of the battery 310.

Although not shown in the drawings, a separate server and a controller may be provided to control the PCS 350 and the BMS 330, store information acquired from the PCS 350 and the BMS 330, and the like. For convenience of explanation, an example in which the PCS 350 and the BMS 330 control the energy storage system without a separate server and controller will be described.

In the energy storage system connected to renewable energy having the above-described configuration, an exemplary power management method according to an energy storage and consumption situation will be described with reference to the drawings.

Figure 3:
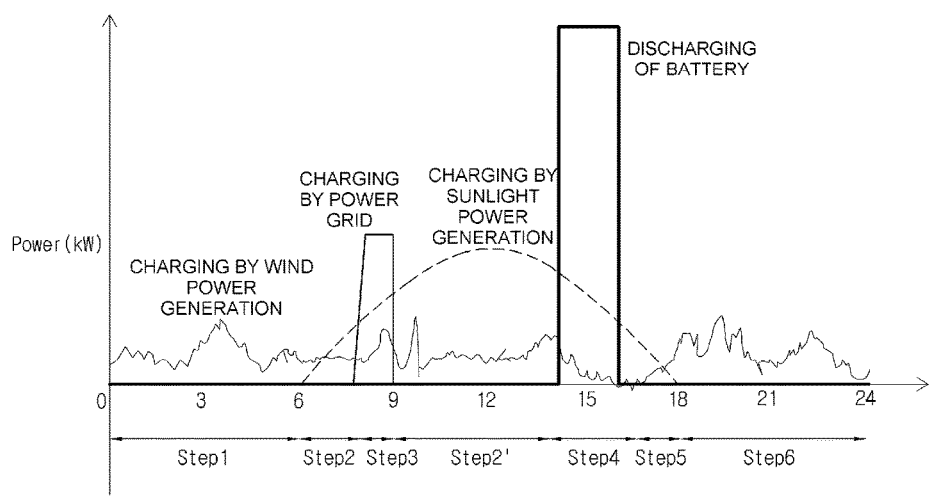
FIG. 3 is a graph illustrating an exemplary charge and discharge cycle according to an exemplary embodiment.
Figure 4:
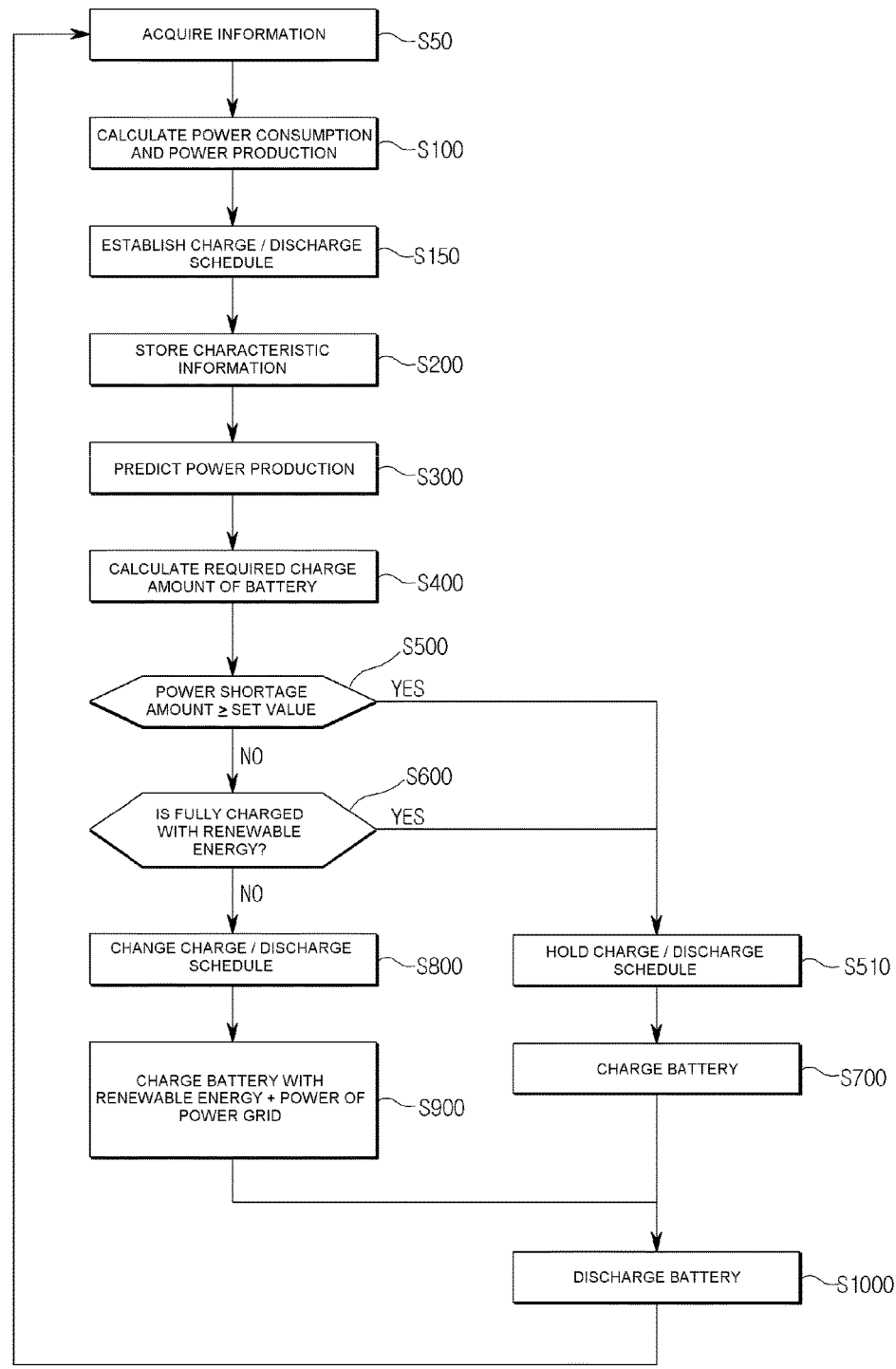
FIG. 4 is a flow chart illustrating a method for managing power of an energy storage system connected to renewable energy according to the exemplary embodiment.

FIG. 3 is a graph illustrating an example of a charge and discharge cycle according to a method for managing power an energy storage system connected to renewable energy according to an exemplary embodiment. FIG. 4 is a flow chart of a method for managing power of the energy storage system connected to renewable energy according to an exemplary embodiment.

A power controller (not shown) that controls an external power supply is equipped with a power server and stores information such as power generation status, power condition, a power rate with time, and a power consumption demand by the general energy source. Power to the power load 400 may be supplied from the power grid 100 and the battery 310 and may also be supplied with power only through any one of the power grid 100 and the battery 310.

As illustrated in FIG. 4, the PCS 350 may acquire the power consumption demand, the power status information, or the like from an external power server (S50) and obtain demand information, such as past and latest power consumption by the power load 400. Based on such information, the PCS 350 may calculate predicted power consumption and predicted power production (S100) and create a charge/discharge schedule of a battery (S150). Although the subject to create, change, and control the charge/discharge schedule of the battery are not mentioned separately, it should be understood that the creation, change, and control of the charge/discharge schedule of the battery are performed by the PCS.

For example, as illustrated in FIG. 3, the charge/discharge schedule may be set so that the battery 310 is discharged at 2:00 to 4:00 pm which is a peak time of power consumption and the charge/discharge schedule may be set so that the battery 310 is charged at different times. Wind power generation among the renewable energy facilities 200 generate electricity for most of the day, and therefore the charging of the battery 310 using wind power generation may be made without time limitation. The photovoltaic power generation is available from sunrise to sunset, and generally produce maximum power around noon, which may be set as the time period to charge the battery 310.

Accordingly, type of renewable energy generation and characteristic information thereof are stored in the PCS 350 (S200). The stored information may be used to predict power production until the discharging of the battery 310 (S300).

The charge/discharge schedule may be set so that the battery 310 using the power grid 100 may be charged at a time when power rate is least or less expensive. For example, the charge/discharge schedule may be set so that the battery 310 is charged at a time when the load is at the lowest, just before an intermediate load time of 9:00 am is effectuated. Power is also generated from the wind and the photovoltaic facilities during the time period when the battery 310 is being charged with power from the power grid 100, and thus wind and photovoltaic power produced at this time may also be supplied to the battery 310. The power produced by the photovoltaic power generation facility 210 and the wind power generation facility 230 during the charge time of the battery 310 using the power grid 100 may be supplied to the battery 310 or to the power load 400 (optionally applied according to the situation).

Under normal conditions, the power produced by the wind power generation facility 230 and the photovoltaic power generation facility 210 and the power produced by the power grid 100 are supplied to the power load 400 and the battery 310 is charged according to the charge/discharge schedule of the battery 310 set by the PCS 350. The PCS 350 may predict the power generation amount of the renewable energy facility 200 from 8:00 am to 2:00 pm so as to mange the charge/discharge schedule of the battery 310 (S300, refer also to FIG. 3). A power generation amount of the renewable energy facility 200 may be obtained through simulations using an average value of a power generation amount over previous 10 days or an annual average data, for example.

When the power generation amount by the renewable energy facility 200 is predicted, the charge amount of the battery 310 is calculated at about 2:00 pm before the discharging of the battery 310 starts. A power shortage amount required to fully charge the battery 310 before the discharging starts, and then a required battery charge amount may be calculated S400).

If the power shortage amount is equal to or greater than a predetermined value (S500), the battery 310 can be fully charged before being discharged, and therefore the charge/discharge schedule of the battery 310 need not be changed (S510). If the power shortage amount is not equal to or greater than the predetermined value (S500), determination is made as to whether the battery 310 may be fully charged by the renewable energy facility 200 based on the calculated value (S600). A residual power amount D1 that is insufficient to fully charge the battery 310 is calculated in kWh. If the battery 310 may be fully charged by the renewable energy facility 200 before the discharging of the battery 310 starts (YES in S600), the battery 310 is charged according to the charge schedule described above (charging step (S700)).

Although the battery 310 is charged using the power grid 100 in a rate interval at the lowest load area, a case in which the battery 310 may not be fully charged by the renewable energy facility 200 before the discharging of the battery 310 starts may occur. This case may be caused by weather conditions, such as when wind does not blow or is cloudy, and other operational various factors, such as failure of the power system, planned power outage, and sudden increase in power load. In such a case (NO in S600), for there to be a smooth supply of power from the battery 310, the charge schedule is changed so that additional power from the power grid 100 is supplied to charge the battery 310 even if a rate time is not the rate time at the lowest load area (S800).

The power amount to be charged through the power grid 100 may be calculated by dividing a residual shortage power amount D1 and a power generation amount (kW) generated from the renewable energy generation facility 200 by hour ((renewable energy generation amount kW+D1)/hr). Based on the calculated value, the battery 310 is charged using the renewable energy and the power supplied from the power grid 100 until the discharge time of the battery 310 (S900). However, since the time when the battery 310 is charged with the power supplied from the power grid 100 is not the time when the rate at the lowest load area is charged, it is possible to request decision-making to a manger or a server so as to determine whether the battery 310 is to be charged with power supplied from the power grid 100 before the discharging of the battery 310 (S900). Whether or not the battery 310 is to be charged by the power grid 100 depending on the residual amount of the battery 310 may be previously stored in the server and determined. The BMS 330 may directly determine whether or not the battery 310 is to be charged according to the circumstances and it may be determined whether or not step S900 proceeds.

After the charging of the battery 310 is completed (S700 or S900), the discharging of the battery 310 is performed in the fully charged state. The power charged in the battery 310, the power generated by the renewable energy facility 200, and the power supplied from the power grid 100 are all supplied to the power load 400 at the peak time when the battery 310 is discharged (S1000). In some cases, the residual power left after supplying power to the power load 400 may be supplied to the power grid 100 to create revenue or may be maintained as residual power in the battery 310.

As described above, the disclosed energy storage system may be operated in consideration of the charge/discharge amount and time for the battery, or the like, according to the characteristics of the renewable energy generation system, thereby improving the efficiency of the energy storage and consumption. According to the exemplary embodiments of the present invention, the method for managing power of an electric storage system (ESS) connected with renewable energy may operate the energy storage system in consideration of the charge/discharge amount and time of the battery, or the like, according to the characteristics of the renewable energy generation system, thereby improving the storage and consumption efficiency of energy.

The embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method for managing power of an energy storage system (ESS) connected to renewable energy, the ESS including an energy storage device connected to a power grid, a battery management system (BMS), a power conditioning system (PCS), and one or more renewable energy generation facilities producing electric energy from renewable energy, the method comprising the steps of:
   determining a predicted power consumption amount of a power load and a predicted power production amount of the renewable energy generation facility (S100);
   storing type and characteristics information of the renewable energy generation facility (S200);
   predicting power production of the renewable energy generation facility based on the stored type and characteristics information (S300);
   determining a required discharge amount for the energy storage device (S400);
   determining whether a power shortage amount is equal to or greater than a predetermined value depending on the required charge amount of the energy storage device (S500);
   determining whether the energy storage device is fully charged with the power production from the renewable energy generation facility if the power shortage amount is smaller than the predetermined value (S600); and
   controlling charging/discharging operation of the energy storage device according to a charge/discharge schedule.

2. The method of claim 1, further comprising:
   establishing an initial charge/discharge schedule of the energy storage device after step S100 (S150).

3. The method of claim 2, further comprising:
   holding the initial charge/discharge schedule of step S150 if the power shortage amount is equal to or greater than the predetermined value in step S500 (S510).

4. The method of claim 3, wherein the step of controlling charging/discharging operation includes charging the energy storage device according to the initial charge/discharge schedule from step S510 (S700).

5. The method of claim 2, further comprising:
   changing the initial charge/discharge schedule of step S150 if the energy storage device is not fully charged with the power production of the renewable energy generation facility in step S600 (S800).

6. The method of claim 5, wherein the step of controlling charging/discharging operation includes charging the energy storage device according to the changed charge/discharge schedule in step S800 (S900).

7. The method of claim 4, wherein the charging of the energy storage device in step S700 is performed by power supplied from the renewable energy generation facility and the power grid.

8. The method of claim 7, wherein the charging by the power supplied from the power grid is performed at time when the lowest load rate is applied.

9. The method of claim 1, wherein the predicted power production amount of the renewable energy generation facility in step S100 is calculated as an average value of power production for a preset period.

10. The method of claim 1, further comprising:
    discharging the energy storage device according to the charge/discharge schedule (S1000).

11. The method of claim 1, wherein the renewable energy generation facility is a power generation facility using any one of sunlight, wind, tide, and biomass.

12. The method of claim 1, wherein the PCS is in communication with an external server to manage the energy storage system.

13. The method of claim 1, wherein the BMS is in communication with an external server to manage the energy storage system.

14. The method of claim 1, wherein the energy storage device is a battery.

* * * * *